US012634778B2

(12) United States Patent
Selvaganapathy et al.

(10) Patent No.: US 12,634,778 B2
(45) Date of Patent: May 19, 2026

(54) EARLY EVALUATION FOR CONDITIONAL RECONFIGURATION

(71) Applicant: Nokia Technologies Oy, Espoo (FI)

(72) Inventors: Srinivasan Selvaganapathy, Bangalore (IN); Ahmad Awada, Munich (DE); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/293,405

(22) PCT Filed: Jul. 7, 2022

(86) PCT No.: PCT/EP2022/068902
§ 371 (c)(1),
(2) Date: Jan. 30, 2024

(87) PCT Pub. No.: WO2023/006377
PCT Pub. Date: Feb. 2, 2023

(65) Prior Publication Data
US 2024/0340729 A1 Oct. 10, 2024

(30) Foreign Application Priority Data

Jul. 30, 2021 (IN) .............................. 202141034368

(51) Int. Cl.
*H04W 36/00* (2009.01)
*H04W 36/36* (2009.01)

(52) U.S. Cl.
CPC . *H04W 36/00838* (2023.05); *H04W 36/0085* (2018.08); *H04W 36/362* (2023.05)

(58) Field of Classification Search
None
See application file for complete search history.

(56) References Cited

U.S. PATENT DOCUMENTS

| | | | |
|---|---|---|---|
| 12,256,453 B2 * | 3/2025 | da Silva | H04W 36/00837 |
| 12,267,749 B2 * | 4/2025 | Kim | H04W 36/362 |
| 2022/0022121 A1 * | 1/2022 | Eklöf | H04W 36/087 |

FOREIGN PATENT DOCUMENTS

| | | |
|---|---|---|
| WO | WO 2020/117121 A1 | 6/2020 |
| WO | WO 2020/162811 A1 | 8/2020 |
| WO | WO 2021/080481 A1 | 4/2021 |

* cited by examiner

*Primary Examiner* — Hong S Cho
(74) *Attorney, Agent, or Firm* — McCarter & English LLP

(57) ABSTRACT

There are provided measures for enabling/realizing an early evaluation for conditional reconfiguration in a mobile/wireless communication system. Such measures exemplarily include that a communication entity obtains an evaluation measurement configuration and an evaluation candidate cell set, performs an evaluation measurement in accordance with the evaluation measurement configuration on the evaluation candidate cell set, and performs or starts evaluating an execution condition for conditional reconfiguration for the evaluation candidate cell set on the basis of a result of the evaluation measurement, in the absence of and/or prior to availability of an actual configuration for conditional reconfiguration.

20 Claims, 10 Drawing Sheets

S110 obtaining evaluation measurement configuration

S120 performing evaluation measurement

S130 evaluating execution condition for conditional reconfiguration

S210 issuing evaluation measurement configuration

S220 initiating/performing preparation of conditional reconfiguration

S310 obtaining reconfiguration demand indication

S320 performing preparation of conditional reconfiguration

S330 issuing actual configuration for conditional reconfiguration

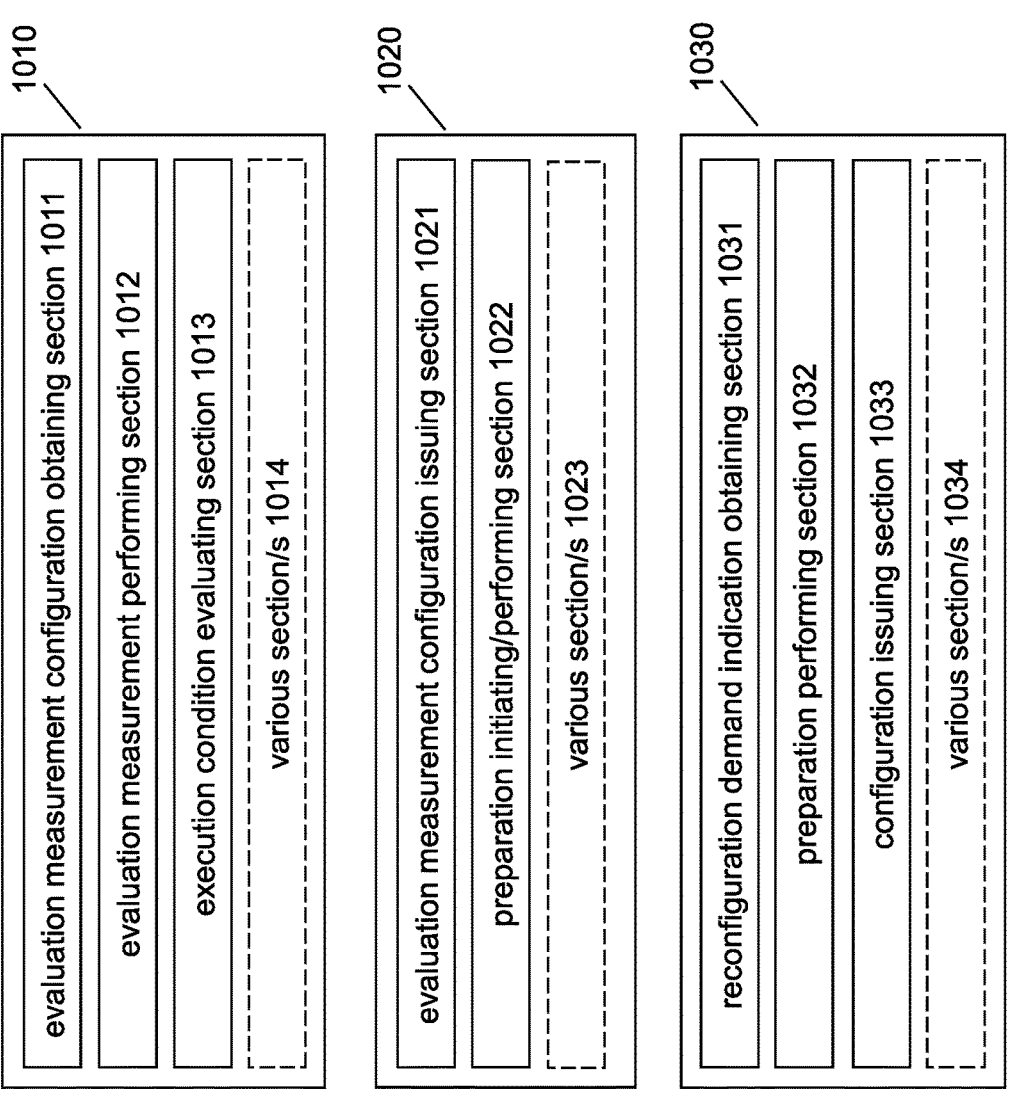

1010 evaluation measurement configuration obtaining section 1011 evaluation measurement performing section 1012 execution condition evaluating section 1013 various section/s 1014

1020 evaluation measurement configuration issuing section 1021 preparation initiating/performing section 1022 various section/s 1023

1030 reconfiguration demand indication obtaining section 1031 preparation performing section 1032 configuration issuing section 1033 various section/s 1034

Figure 10

EARLY EVALUATION FOR CONDITIONAL RECONFIGURATION

CROSS REFERENCE TO RELATED APPLICATION

This patent application is a U.S. National Stage application of International Patent Application Number PCT/EP2022/068902 filed Jul. 7, 2022, which is hereby incorporated by reference in its entirety, and claims priority to IN 202141034368 filed Jul. 30, 2021.

FIELD

The present disclosure relates to an early evaluation for conditional reconfiguration (in a mobile/wireless communication system). More specifically, the present disclosure relates to measures/mechanisms (including methods, apparatuses (i.e. devices, entities, elements and/or functions) and computer program products) for enabling/realizing an early evaluation for conditional reconfiguration (in a mobile/wireless communication system).

BACKGROUND

Basically, the present disclosure relates to conditional reconfiguration in a mobile/wireless communication system, e.g. a 3GPP-standardized mobile/wireless communication system, such as a 5G/NR system or next generations beyond 5G.

In modern mobile/wireless communication systems, mobility robustness is a vital aspect from UE perspective, and various approaches of conditional reconfiguration are introduced for improving mobility robustness. Such approaches generally refer to change/modification of a RRC connection when one or more corresponding execution conditions are met.

For example, 3GPP Rel-16 systems (for NR and LTE) support conditional handover (CHO) and conditional PSCell change or addition/change (CPC/CPAC) for intra-SN scenarios (in MR-DC), and 3GPP Rel-16 systems (for NR and LTE) include further enhancements to support conditional PSCell change or addition/change (CPC/CPAC) for inter-SN scenarios (in MR-DC).

In the cases of CHO and inter-SN CPC/CPAC, additional inter-node signaling within the network is required for the preparation of target cells (for the conditional reconfiguration). Such additional inter-node signaling leads to delay in delivering the conditional reconfiguration towards the UE, i.e. providing the actual configuration of the target cells for enabling execution of the conditional reconfiguration at the UE. For a network with CU-DU architecture, the internal delay for preparation will be even higher.

As an example, a procedure of signaling steps associated with SN-initiated CPC/CPAC is given for an inter-SN scenario.

1. The UE performs measurements for CPC/CPAC preparation and provides a measurement report to the S-SN which is meant to trigger (preparation of) the conditional reconfiguration. This measurement report is triggered based on a measurement configuration (measurement-ID) which is configured for an A3 or A4 event with shorter threshold to allow early reporting.
2. On receiving this measurement report, the S-SN initiates inter-SN CPC/CPAC preparation for preparing multiple target cells, i.e. T-SNs.

3. After completion of inter-SN CPC/CPAC preparation, the S-SN informs the MN accordingly, and the MN sends the RRC reconfiguration message containing CPC/CPAC configurations (of one or more potential T-SNs) resulting from the preparation to the UE.
4. On receiving the CPC/CPAC configurations, the UE starts/performs measurements for CPC/CPAC evaluation on the applicable target cells, i.e. T-SNs, which are derived from the cell-ID of the serving-cell common configuration of the CPC/CPAC configurations. Thereby, the UE evaluates the execution condition/s for the conditional reconfiguration of the respective applicable target cells, i.e. T-SNs.

As noted above, for the measurements associated with a measurement configuration (measurement-ID) which is configured with a conditional-trigger, the applicable target cells for measurement evaluation are deduced from the cell identity of CPC/CPAC configurations included in the RRC reconfiguration message. In other words, the measurements for CPC/CPAC evaluation are tied to the presence of CPC/CPAC configurations, i.e. subject to completion of the CPC/CPAC preparation.

With the above procedure, the measurements for CPC/CPAC evaluation start in step 4, namely after a delay associated with steps 2 and 3. The CPC/CPAC execution requires a minimum amount of measurements to be collected along with additional time to wait to trigger execution such as TTT. Thus, starting the CPC/CPAC evaluation later also delays the (start of) the CPC/CPAC execution. Delayed CPC/CPAC execution may lead in that the UE continues operation on the source cell, i.e. S-SN, with poor quality for a longer time, and chances of radio link failure (RLF) in the source cell, i.e. S-SN, may also be higher in this situation.

For example, the delay associated with the above procedure would be at least 4 times the inter-node message delay in case of SN-initiated CPC/CPAC (4×~5 ms=~20 ms) and 2 times the RRC message delay (2×~10 ms=~20 ms), resulting in ~40 ms in total.

Moreover, if the UE reports (in step 1) intra-SN candidate-cells along with inter-SN candidate cells, as a result of the initial measurement (which is the basis for CPC/CPAC preparation), a delay in preparation of suitable inter-SN target cells (which, due to required additional inter-node signaling, takes longer than preparation of suitable intra-SN target cells) may lead to intra-SN CPC/CPAC execution in advance. In this case, the UE might have started execution towards an intra-SN cell, which may not be the best target cell for CPC/CPAC execution, just because the preparation of another better (inter-SN) cell is delayed due to longer inter-node preparation time. In this case, the UE may experience S-RLF immediately after the CPC/CPAC due to interference from the best target PSCell (i.e. primary cell of secondary cell group).

As mentioned above, the problems of longer delay and degraded connection quality do not only apply to CPC/CPAC, particularly for inter-SN scenarios, but in general to all kinds of conditional reconfiguration.

For example, these problems are also applicable for CHO, particularly dual-connectivity CHO (DC-CHO) where the target node needs to prepare dual connectivity). By way of CHO, including DC-CHO, the preparation of which also involves multiple nodes and inter-node signaling for preparation, the number of radio link failures (RLFs) and/or handover failures (HoFs) can be reduced as compared to a legacy handover approach. Therein, inter-node signaling between a master node and potential target nodes is required for CHO preparation before enabling CHO execution at the UE based on corresponding measurements and CHO configurations of the potential target nodes. Yet, the delay in the case of CHO is shorter than in the case of inter-SN CPC/CPAC, since only two nodes are involved in internode messages/signaling for CHO, while three nodes are involved in internode messages/signaling for CPC/CPAC.

Further, these problems are applicable for intra-RAT CHO as well as inter-RAT CHO (which may be required for NR/LTE mobility robustness).

As described above, there exist problems in conditional reconfiguration (in a mobile/wireless communication system), which basically result from the consecutiveness of preparation of conditional reconfiguration and evaluation of conditional reconfiguration, i.e. the requirement of awaiting the completion of the preparation phase and, thus, the availability/provision of an actual configuration for conditional reconfiguration (i.e. target cell configurations) before enabling/starting the evaluation phase.

Therefore, there is a demand/need as well as room for improvement for a technique for (enabling/realizing) an early evaluation for conditional reconfiguration (in a mobile/wireless communication system).

SUMMARY

Various exemplifying embodiments of the present disclosure aim at addressing at least part of the above issues and/or problems and drawbacks.

Various aspects of exemplifying embodiments of the present disclosure are set out in the appended claims.

According to an example aspect of the present disclosure, there is provided a method, comprising: obtaining an evaluation measurement configuration and an evaluation candidate cell set, said evaluation measurement configuration being configured to initiate an early evaluation of conditional reconfiguration prior to availability of an actual configuration for conditional reconfiguration, performing an evaluation measurement in accordance with the evaluation measurement configuration on the evaluation candidate cell set, and evaluating an execution condition for conditional reconfiguration for the evaluation candidate cell set on the basis of a result of the evaluation measurement.

According to an example aspect of the present disclosure, there is provided an apparatus, the apparatus comprising at least one processor and at least one memory including computer program code, wherein the processor, with the at least one memory and the computer program code, is configured to cause the apparatus to perform: obtaining an evaluation measurement configuration and an evaluation candidate cell set, said evaluation measurement configuration being configured to initiate an early evaluation of conditional reconfiguration prior to availability of an actual configuration for conditional reconfiguration, performing an evaluation measurement in accordance with the evaluation measurement configuration on the evaluation candidate cell set, and evaluating an execution condition for conditional reconfiguration for the evaluation candidate cell set on the basis of a result of the evaluation measurement.

According to an example aspect of the present disclosure, there is provided an apparatus, comprising: means or circuitry for obtaining an evaluation measurement configuration and an evaluation candidate cell set, said evaluation measurement configuration being configured to initiate an early evaluation of conditional reconfiguration prior to availability of an actual configuration for conditional reconfiguration, means or circuitry for performing an evaluation measurement in accordance with the evaluation measurement configuration on the evaluation candidate cell set, and means or circuitry for evaluating an execution condition for conditional reconfiguration for the evaluation candidate cell set on the basis of a result of the evaluation measurement.

According to various developments/modifications, any one of the aforementioned method-related and/or apparatus-related example aspects of the present disclosure may include one or more of the following features:

performing the evaluation measurement and evaluating the execution condition are started in the absence of and/or prior to obtaining the actual configuration for conditional reconfiguration, the method, functionality or operability further comprises obtaining a preparation measurement configuration and a preparation candidate cell set, performing a preparation measurement in accordance with the preparation measurement configuration on the preparation candidate cell set, and/or issuing a measurement report for at least part of the preparation candidate cell set in accordance with a specified event trigger on the basis of a result of the preparation measurement, the preparation measurement configuration is obtained by a first message, and the evaluation measurement configuration is obtained by a second message after issuing the measurement report, performing the evaluation measurement and evaluating the execution condition are started upon receiving the second message, the preparation measurement configuration and the evaluation measurement configuration are obtained by a single message, the single message comprises a link between the preparation measurement configuration and the evaluation measurement configuration, and the link specifies the evaluation candidate cell set based on the at least part of the preparation candidate cell set for which the measurement report is issued, performing the evaluation measurement and evaluating the execution condition are started in accordance with the specified event trigger or upon issuing the measurement report, the method, functionality or operability further comprises obtaining the actual configuration for conditional reconfiguration indicating a potential target cell set, and/or controlling and/or executing conditional reconfiguration with respect to the potential target cell set, conditional reconfiguration is controlled and/or executed based on the obtained actual configuration for conditional reconfiguration, the potential target cell set is indicated as a modification of the evaluation candidate cell set, controlling and/or executing conditional reconfiguration comprises: in a case that the execution condition for conditional reconfiguration is met for a cell contained in the potential target cell set before or within a predefined time period before obtaining the actual configuration for conditional reconfiguration, starting execution of the conditional reconfiguration for said cell, controlling and/or executing conditional reconfiguration comprises: in a case that the execution condition for conditional reconfiguration is not met for a cell when obtaining the actual configuration for conditional reconfiguration, if said cell is contained in the potential target cell set, continuing evaluation for said cell and starting execution of the conditional reconfiguration for said cell when the execution condition for conditional reconfiguration is met, and/or in a case that the execution condition for conditional reconfiguration is not met for a cell when obtaining the actual configuration for conditional reconfiguration, if said cell is not contained in the potential target cell set, stopping evaluation for said cell, the method, functionality or operability further comprises obtaining a common configuration for conditional reconfiguration relating to a random access procedure for at least one potential target cell, and/or starting execution of the random access procedure to the at least one potential target cell when the execution condition for conditional reconfiguration is met for the at least one potential target cell, execution of the random access procedure is started in the absence of and/or prior to obtaining the actual configuration for conditional reconfiguration, the method, functionality or operability further comprises obtaining scheduling request resources for the at least one potential target cell, issuing a random access message to the at least one potential target cell using the scheduling request resources, and/or requesting issuance of a reconfiguration completion confirmation for the at least one potential target cell when obtaining the actual configuration for conditional reconfiguration in which the at least one potential target cell is contained in the potential target cell set, the evaluation measurement configuration and the common configuration are obtained by a same message, the method, functionality or operability further comprises obtaining a reconfiguration inhibition instruction being configured to inhibit execution of a specific conditional reconfiguration based on a previously obtained actual configuration for conditional reconfiguration, obtaining an updated actual configuration for conditional reconfiguration, and/or controlling and/executing conditional reconfiguration based on the updated actual configuration for conditional reconfiguration, in a case that the updated actual configuration for conditional reconfiguration is not obtained or not obtained within a predefined time period after obtaining the reconfiguration inhibition instruction, conditional reconfiguration is controlled and/or executed based on the previously obtained actual configuration for conditional reconfiguration, the conditional reconfiguration comprises or relates to at least one of the following: conditional dual-connectivity primary/secondary cell change, conditional PSCell (primary cell of secondary cell group) change, conditional PSCell (primary cell of secondary cell group) addition/change, conditional handover, dual-connectivity conditional handover, the method, functionality or operability is operable at or by or as a communication element or function of/in a wireless communication system, such as a user equipment entity, the method, functionality or operability is operable in a wireless communication system based on a 3GPP standard, such as a 5G or NR system.

According to an example aspect of the present disclosure, there is provided a method, comprising: issuing an evaluation measurement configuration and an evaluation candidate cell set, said evaluation measurement configuration being configured to initiate an early evaluation of conditional reconfiguration prior to availability of an actual configuration for conditional reconfiguration, and initiating and/or performing preparation of conditional reconfiguration with respect to the evaluation candidate cell set.

According to an example aspect of the present disclosure, there is provided an apparatus, the apparatus comprising at least one processor and at least one memory including computer program code, wherein the processor, with the at least one memory and the computer program code, is configured to cause the apparatus to perform: issuing an evaluation measurement configuration and an evaluation candidate cell set, said evaluation measurement configuration being configured to initiate an early evaluation of conditional reconfiguration prior to availability of an actual configuration for conditional reconfiguration, and initiating and/or performing preparation of conditional reconfiguration with respect to the evaluation candidate cell set.

According to an example aspect of the present disclosure, there is provided an apparatus, comprising: means or circuitry for issuing an evaluation measurement configuration and an evaluation candidate cell set, said evaluation measurement configuration being configured to initiate an early evaluation of conditional reconfiguration prior to availability of an actual configuration for conditional reconfiguration, and means or circuitry for initiating and/or performing preparation of conditional reconfiguration with respect to the evaluation candidate cell set.

According to various developments/modifications, any one of the aforementioned method-related and/or apparatus-related example aspects of the present disclosure may include one or more of the following features:

the preparation of conditional reconfiguration is initiated and/or started to be performed upon or together with issuing the evaluation measurement configuration, the method, functionality or operability further comprises issuing a preparation measurement configuration and a preparation candidate cell set, and/or obtaining a measurement report for at least part of the preparation candidate cell set, the method, functionality or operability further comprises deciding the evaluation candidate cell set based on the at least part of the preparation candidate cell set for which the measurement report is obtained, the preparation measurement configuration is issued by a first message, and/or the evaluation measurement configuration is issued by a second message after obtaining the measurement report, the second message is configured to cause starting of performing an evaluation measurement and evaluating an execution condition at the receiving entity.

the preparation measurement configuration and the evaluation measurement configuration are issued by a single message, the single message comprises a link between the preparation measurement configuration and the evaluation measurement configuration, and/or the link specifies the evaluation candidate cell set based on the at least part of the potential target cell set for which the measurement report is obtained, the method, functionality or operability further comprises issuing the actual configuration for conditional reconfiguration indicating a potential target cell set, the actual configuration for conditional reconfiguration is configured to cause controlling and/or executing conditional reconfiguration with respect to the potential target cell set at the receiving entity, the potential target cell set is indicated as a modification of the evaluation candidate cell set, the actual configuration for conditional reconfiguration is issued upon or after completion of the preparation of conditional reconfiguration, the method, functionality or operability further comprises issuing a common configuration for conditional reconfiguration relating to a random access procedure for at least one potential target cell, the common configuration is configured to cause starting execution of the random access procedure to the at least one potential target cell when an execution condition for conditional reconfiguration is met for the at least one potential target cell at the receiving entity, the evaluation measurement configuration and the common configuration are issued by a same message, the method, functionality or operability further comprises issuing a reconfiguration inhibition instruction being configured to inhibit execution of a specific conditional reconfiguration based on a previously obtained actual configuration for conditional reconfiguration, performing preparation of conditional reconfiguration comprises: performing admission control for the evaluation candidate cell set, and/or obtaining configurations of the evaluation candidate cell set, performing preparation of conditional reconfiguration comprises: deciding a potential target cell set for the actual configuration for conditional reconfiguration as at least part of the evaluation candidate cell set for which admission control is successful and/or configurations are obtained and/or appropriate, initiating preparation of conditional reconfiguration comprises: issuing a reconfiguration demand indication indicating that early evaluation of conditional reconfiguration is started together with the evaluation candidate cell set, the reconfiguration indication is configured to cause performing preparation of conditional reconfiguration at the receiving entity, the conditional reconfiguration comprises or relates to at least one of the following: conditional dual-connectivity primary/secondary cell change, conditional PSCell (primary cell of secondary cell group) change, conditional PSCell (primary cell of secondary cell group) addition/change, conditional handover, dual-connectivity conditional handover, the method, functionality or operability is operable at or by or as a communication control element or function of/in a wireless communication system, such as a base station entity, the method, functionality or operability is operable at or by or as a communication control entity acting or serving as a source entity in/for the conditional reconfiguration, such as a source node or source secondary node, the method, functionality or operability is operable in a wireless communication system based on a 3GPP standard, such as a 5G or NR system.

According to an example aspect of the present disclosure, there is provided a method, comprising: obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, performing preparation of conditional reconfiguration with respect to the evaluation candidate cell set, and issuing the actual configuration for conditional reconfiguration indicating a potential target cell set.

According to an example aspect of the present disclosure, there is provided an apparatus, the apparatus comprising at least one processor and at least one memory including computer program code, wherein the processor, with the at least one memory and the computer program code, is configured to cause the apparatus to perform: obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, performing preparation of conditional reconfiguration with respect to the evaluation candidate cell set, and issuing the actual configuration for conditional reconfiguration indicating a potential target cell set.

According to an example aspect of the present disclosure, there is provided an apparatus, comprising: means or circuitry for obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, means or circuitry for performing preparation of conditional reconfiguration with respect to the evaluation candidate cell set, and means or circuitry for issuing the actual configuration for conditional reconfiguration indicating a potential target cell set.

According to various developments/modifications, any one of the aforementioned method-related and/or apparatus-related example aspects of the present disclosure may include one or more of the following features:

the actual configuration for conditional reconfiguration is configured to cause controlling and/or executing conditional reconfiguration with respect to the potential target cell set at the receiving entity, performing preparation of conditional reconfiguration comprises: performing admission control for the evaluation candidate cell set, and/or obtaining configurations of the evaluation candidate cell set, performing preparation of conditional reconfiguration comprises: deciding the potential target cell set for the actual configuration for conditional reconfiguration as at least part of the evaluation candidate cell set for which admission control is successful and/or configurations are obtained and/or appropriate, the preparation of conditional reconfiguration is performed upon or after obtaining the reconfiguration demand indication, the actual configuration is issued upon or after completion of the preparation of conditional reconfiguration, the method, functionality or operability further comprises issuing a preparation measurement configuration and a preparation candidate cell set, the conditional reconfiguration comprises or relates to at least one of the following: conditional dual-connectivity primary/secondary cell change, conditional PSCell (primary cell of secondary cell group) change, conditional PSCell (primary cell of secondary cell group) addition/change, dual-connectivity conditional handover, the method, functionality or operability is operable at or by or as a communication control element or function of/in a wireless communication system, such as a base station entity, the method, functionality or operability further comprises is operable at or by or as a communication control entity acting or serving as a master entity in a dual-connectivity scenario, such as a master node, the method, functionality or operability further comprises is operable in a wireless communication system based on a 3GPP standard, such as a 5G or NR system.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, an early evaluation for conditional reconfiguration (in a mobile/wireless communication system) can be enabled/realized. Thereby, a delay in (execution of) conditional reconfiguration can be reduced, and/or problems in terms of degraded connection quality (e.g. increased risk of RLFs, HoFs, etc.) can be reduced.

BRIEF DESCRIPTION OF THE DRAWINGS

In the following, the present disclosure will be described in greater detail by way of non-limiting examples with reference to the accompanying drawings, in which FIG. 10 shows a schematic block diagram illustrating an example of a structure of apparatuses according to at least one exemplifying embodiment.

DETAILED DESCRIPTION

Figure 1:
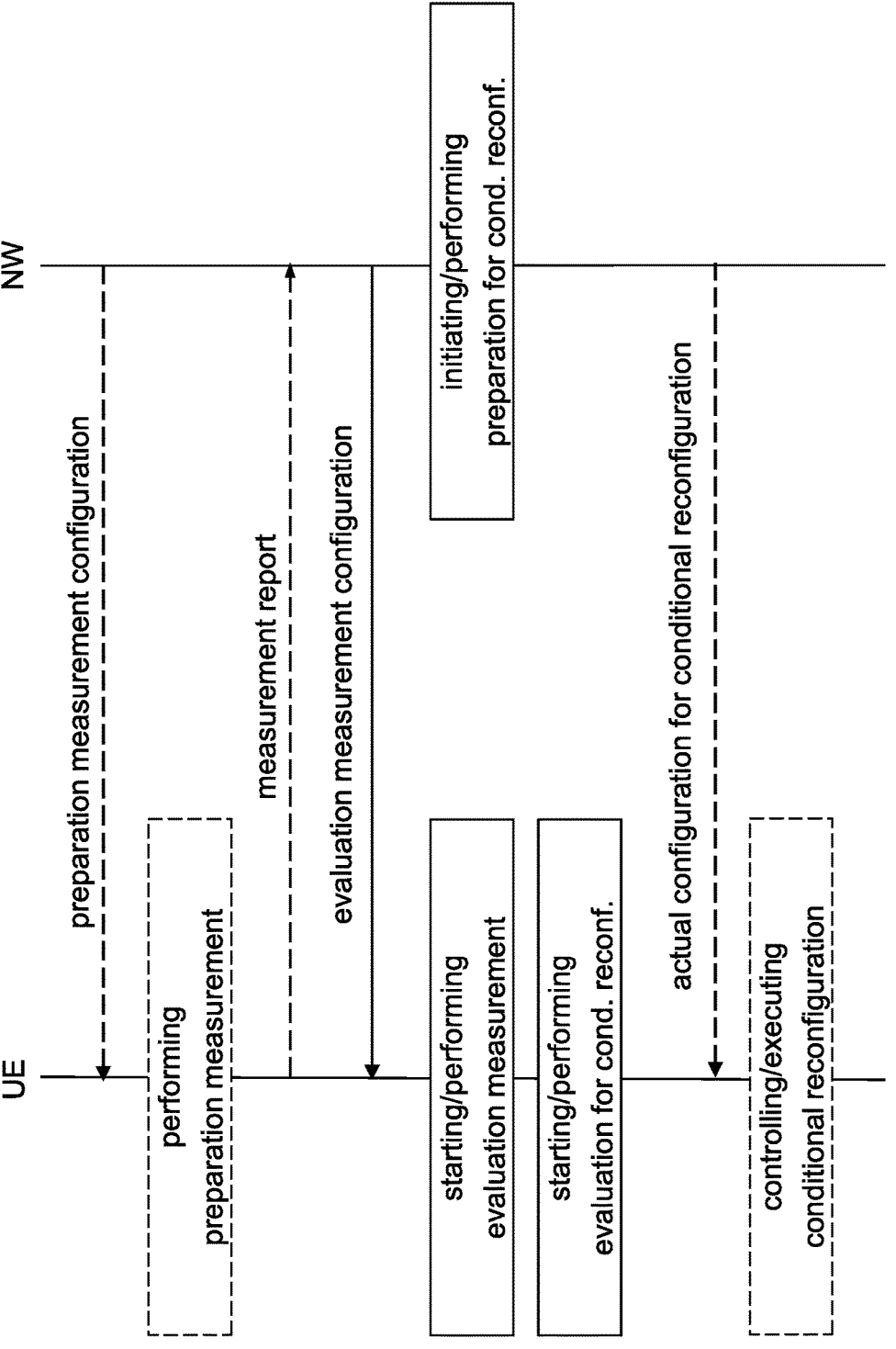
FIG. 1 shows a sequence diagram illustrating an example of a procedure according to at least one exemplifying embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to 3GPP standards, specially referring to 5G/NR standardization, being used as non-limiting examples. As such, the description of exemplifying embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or exemplifying embodiments described herein are applicable to it.

For examples, the present disclosure is equally applicable in modern communication systems, such as 5G/NR systems, and future communication systems, such as next generations beyond 5G (i.e. 6G, 7G, . . . ).

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. In flowcharts or sequence diagrams, the illustrated order of operations or actions is generally illustrative/exemplifying, and any other order of respective operations or actions is equally conceivable, if feasible.

According to exemplifying embodiments of the present disclosure, in general terms, there are provided measures/mechanisms (including methods, apparatuses (i.e. devices, entities, elements and/or functions) and computer program products) for enabling/realizing an early evaluation for conditional reconfiguration (in a mobile/wireless communication system).

Hereinafter, an evaluation measurement configuration may be regarded/understood as a means or measure or signal or message or contents or the like, which indicates (e.g. includes) a measurement configuration for evaluation of conditional reconfiguration, and a preparation measurement configuration may be regarded/understood as a means or measure or signal or message or contents or the like, which indicates (e.g. includes) a measurement configuration for preparation of conditional reconfiguration. Based on the evaluation measurement configuration, an entity such as a UE may perform a corresponding measurement in accordance with the thus given configuration (i.e. properties, etc., such as for an evaluation candidate cell set), which may (but does not need to) be used in evaluation of conditional reconfiguration, such as e.g. early CPAC/CHO evaluation or triggering. Based on the preparation measurement configuration, an entity such as a UE may perform a corresponding measurement in accordance with the thus given configuration (i.e. properties, etc., such as a preparation candidate cell set), which may (but does not need to) be used in preparation of conditional reconfiguration, such as e.g. early CPAC/CHO evaluation or triggering.

FIG. 1 shows a sequence diagram illustrating an example of a procedure according to at least one exemplifying embodiment. The thus illustrated procedure is operable in any mobile/wireless communication system, e.g. a 3GPP-standardized mobile/wireless communication system, such as a 5G/NR system or next generations beyond 5G, and is applicable to any kind of conditional reconfiguration supported by such system (and/or the involved entities).

In FIG. 1, UE denotes a user equipment entity as an example of a communication element or function of such system, and NW denotes a network entity such as a base station entity as an example of a communication control element or function of such system, particularly a network entity acting or serving as a source entity in/for the conditional reconfiguration, such as a source node (in/for any kind of CHO or the like) or a source secondary node (in/for any kind of CPC, CPAC or the like).

In the procedure of FIG. 1, the NW node issues an evaluation measurement configuration (which may indicate (e.g. include) a measurement configuration for evaluation of conditional reconfiguration) and an evaluation candidate cell set (i.e. a list or set of one or more cells or nodes such as base station entities to be subjected to evaluation measurement), e.g. by sending a corresponding message comprising such evaluation measurement configuration towards the UE, and the UE obtains this evaluation measurement configuration, e.g. by receiving a corresponding message comprising such evaluation measurement configuration from the NW node. The evaluation measurement configuration is configured to initiate an early evaluation of conditional reconfiguration prior to availability of an actual configuration for conditional reconfiguration (at the UE). Accordingly, upon obtaining the evaluation measurement configuration, the UE performs or starts performing an evaluation measurement in accordance with the evaluation measurement configuration on the evaluation candidate cell set (i.e. the one or more cells or nodes in such list or set), and evaluates or start evaluating an execution condition for conditional reconfiguration for the evaluation candidate cell set (i.e. the one or more cells or nodes in such list or set) on the basis of a result of the evaluation measurement. Upon or together with issuing the evaluation measurement configuration, the NW node initiates and/or performs preparation of conditional reconfiguration with respect to the evaluation candidate cell set (i.e. the one or more cells or nodes in such list or set).

As indicated by dashed lines, in the procedure of FIG. 1, the NW node may issue an actual configuration for conditional reconfiguration, which indicates (e.g. includes) a potential target cell set (i.e. a list or set of one or more cells or nodes such as base station entities to be subjected to conditional reconfiguration control and/or execution), e.g. by sending a corresponding message comprising such actual configuration for conditional reconfiguration towards the UE. The actual configuration for conditional reconfiguration is configured to cause controlling and/or executing conditional reconfiguration with respect to the potential target cell set at the receiving entity, i.e. the UE, and may comprise the potential target cell set, e.g. as a modification of the evaluation candidate cell set (in the previous evaluation measurement configuration). The NW node may issue the actual configuration for conditional reconfiguration upon or after completion of the preparation of conditional reconfiguration. Then, the UE may obtain this actual configuration for conditional reconfiguration, e.g. by receiving a corresponding message comprising such actual configuration for conditional reconfiguration from the NW node, and may execute and/or control (execution of) conditional reconfiguration with respect to the potential target cell set (i.e. the one or more cells or nodes in such list or set).

As indicated by dashed lines, in the procedure of FIG. 1, the NW node may issue a preparation measurement configuration (which may indicate (e.g. include) a measurement configuration for preparation of conditional reconfiguration) and a preparation candidate cell set (i.e. a list or set of one or more cells or nodes such as base station entities to be subjected to preparation measurement), e.g. by sending a corresponding message comprising such preparation measurement configuration towards the UE, and the UE may obtain this preparation measurement configuration, e.g. by receiving a corresponding message comprising such preparation measurement configuration from the NW node. Then, the UE may perform a preparation measurement in accordance with the preparation measurement configuration on the preparation candidate cell set (i.e. the one or more cells or nodes in such list or set), and may issue (e.g. send) a measurement report for at least part of the preparation candidate cell set in accordance with a specified event trigger on the basis of a result of the preparation measurement, which may then be obtained (e.g. received) at the NW node.

As described below, the preparation measurement configuration and the evaluation measurement configuration do not need to be provided or transferred separately (as exemplified in FIG. 1), but can also be provided or transferred commonly, and the resulting sequence of messages and/or operations can thus be different from the illustration in FIG. 1.

As shown in FIG. 1, performing the evaluation measurement and evaluating the execution condition may be started in the absence of and/or prior to obtaining the actual configuration for conditional reconfiguration (which is provided only after completion of the preparation of conditional reconfiguration at the network side).

Accordingly, beneficial technical effects (in addressing aforementioned problems) can be achieved by decoupling or delinking (start of) the evaluation measurement and the related condition/execution evaluation and (provision/availability of) the actual reconfiguration for conditional reconfiguration at the UE, i.e. preventing that the UE has to await completion of the preparation phase before enabling/starting the evaluation phase.

Figure 2:
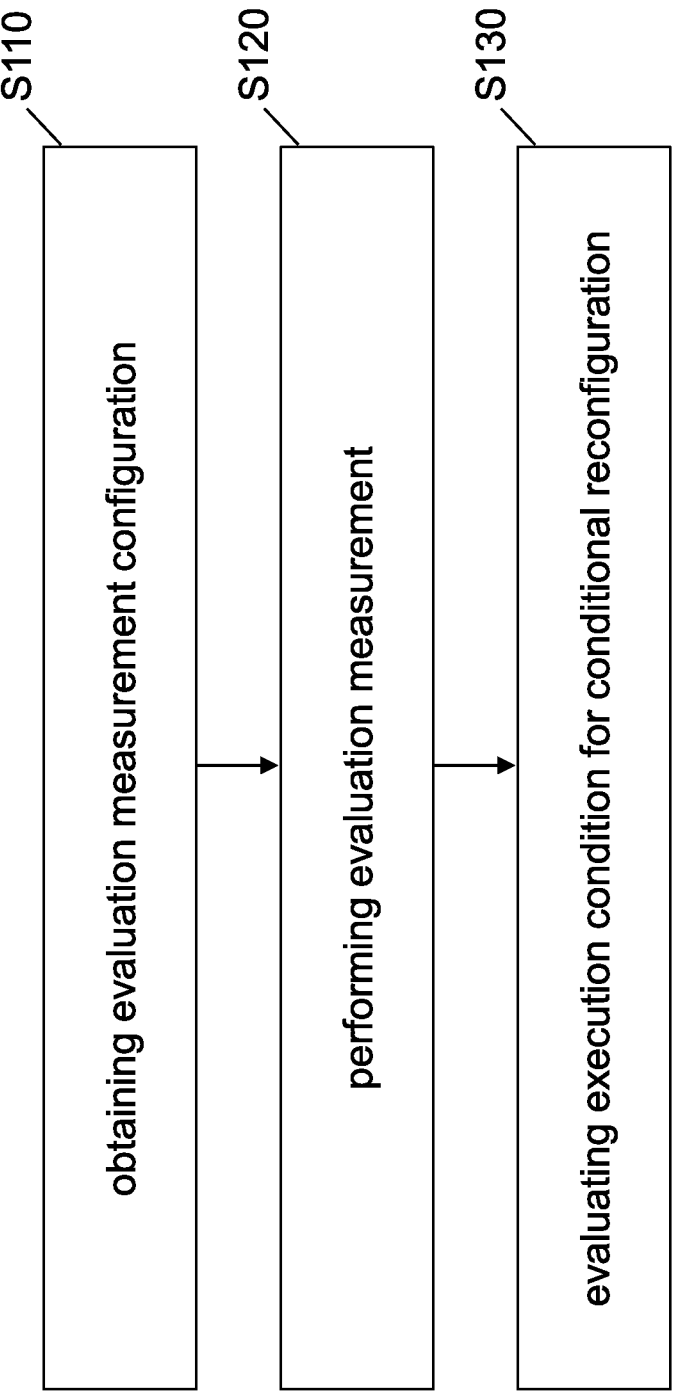
FIG. 2 shows a flowchart illustrating an example of a method or process according to at least one exemplifying embodiment.

FIG. 2 shows a flowchart illustrating an example of a method or process according to at least one exemplifying embodiment. The method or process of FIG. 2 is a method or process of (or, stated in other words, operable or for use in/by) a communication element or function such as a user equipment entity, such as e.g. the UE of FIG. 1.

As shown in FIG. 2, the method or process comprises an operation (S110) of obtaining an evaluation measurement configuration (which may be indicating a measurement configuration for evaluation of conditional reconfiguration) and an evaluation candidate cell set, said evaluation measurement configuration being configured to initiate an early evaluation of conditional reconfiguration prior to availability of an actual configuration for conditional reconfiguration, an operation (S120) of performing an evaluation measurement in accordance with the evaluation measurement configuration on the evaluation candidate cell set, and an operation (S130) of evaluating an execution condition for conditional reconfiguration for the evaluation candidate cell set on the basis of a result of the evaluation measurement.

In view of FIG. 1, the method or process of the communication element or function may also comprise an operation of obtaining a preparation measurement configuration (which may be indicating a measurement configuration for preparation of conditional reconfiguration) and a preparation candidate cell set, an operation of performing a preparation measurement in accordance with the preparation measurement configuration on the preparation candidate cell set, and an operation of issuing a measurement report for at least part of the preparation candidate cell set in accordance with a specified event trigger on the basis of a result of the preparation measurement.

In view of FIG. 1, the method or process of the communication element or function may comprise an operation of obtaining the actual configuration for conditional reconfiguration indicating a potential target cell set, e.g. as a modification of the evaluation candidate cell set, and an operation of controlling and/or executing conditional reconfiguration with respect to the potential target cell set.

Figure 3:
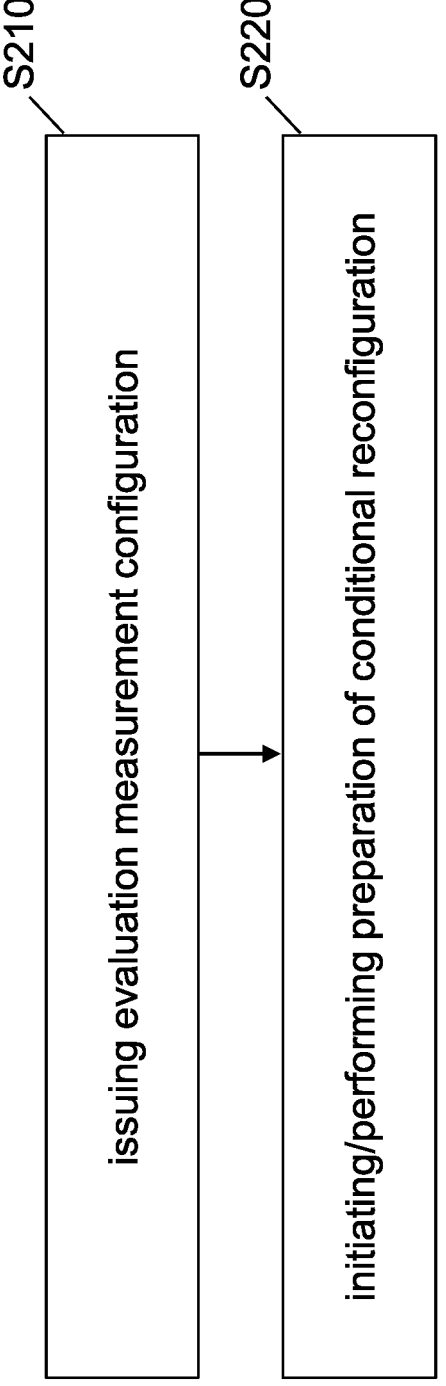
FIG. 3 shows a flowchart illustrating an example of a method or process according to at least one exemplifying embodiment.

FIG. 3 shows a flowchart illustrating an example of a method or process according to at least one exemplifying embodiment. The method or process of FIG. 3 is a method or process of (or, stated in other words, operable or for use in/by) a communication control element or function of such system, such as a base station entity, particularly a network entity acting or serving as a source entity in/for the conditional reconfiguration, such as e.g. the NW node of FIG. 1.

As shown in FIG. 3, the method or process comprises an operation (S210) of issuing an evaluation measurement configuration (which may be indicating a measurement configuration for evaluation of conditional reconfiguration) and an evaluation candidate cell set, said evaluation measurement configuration being configured to initiate an early evaluation of conditional reconfiguration prior to availability of an actual configuration for conditional reconfiguration, and an operation (S220) of initiating and/or performing preparation of conditional reconfiguration with respect to the evaluation candidate cell set.

In view of FIG. 1, the method or process of the communication control element or function may comprise an operation of issuing a preparation measurement configuration (which may be indicating a measurement configuration for preparation of conditional reconfiguration) and a preparation candidate cell set, and an operation of obtaining a measurement report for at least part of the preparation candidate cell set.

In view of FIG. 1, the method or process of the communication control element or function may comprise an operation of issuing the actual configuration for conditional reconfiguration indicating a potential target cell set, e.g. as a modification of the evaluation candidate cell set, wherein the actual configuration for conditional reconfiguration is configured to cause controlling and/or executing conditional reconfiguration with respect to the potential target cell set at the receiving entity.

Figure 4:
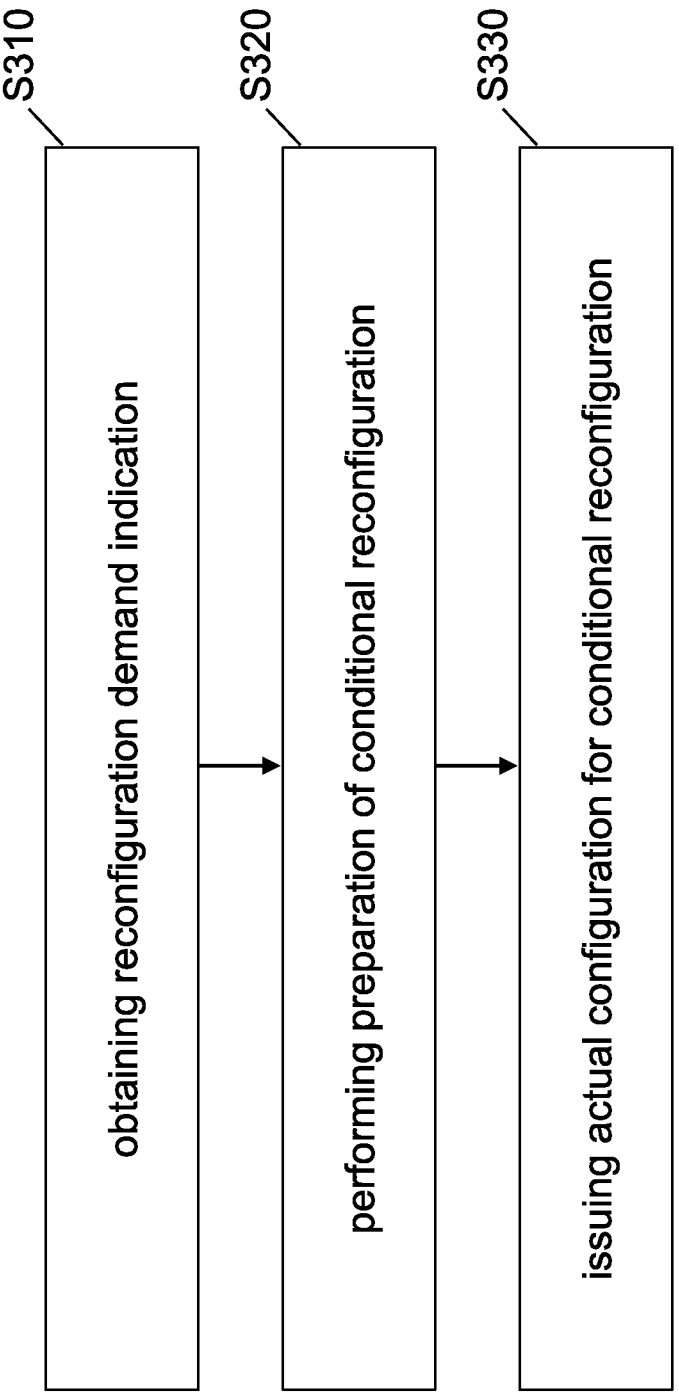
FIG. 4 shows a flowchart illustrating an example of a method or process according to at least one exemplifying embodiment.

FIG. 4 shows a flowchart illustrating an example of a method or process according to at least one exemplifying embodiment. The method or process of FIG. 4 is a method or process of (or, stated in other words, operable or for use in/by) a communication control element or function of such system, such as a base station entity, particularly a network entity acting or serving as a master entity in/for the conditional reconfiguration in a dual-connectivity scenario, such as a master node.

As shown in FIG. 4, the method or process comprises an operation (S310) of obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, an operation (S320) of performing preparation of conditional reconfiguration with respect to the evaluation candidate cell set, and an operation (S330) of issuing the actual configuration for conditional reconfiguration indicating a potential target cell set, e.g. as a modification of the evaluation candidate cell set.

In the following, various exemplifying embodiments are explained in detail for various use case in order to facilitate understanding of applicable modes and realizations of the principles described above.

Generally, any teaching referring to CPAC is applicable to any kind of CPC or CPAC, and any teaching referring to CHO is applicable to any kind of CHO.

A solution according to a first approach basically represents network configuration of early evaluation of/for conditional reconfiguration.

In this solution according to at least one exemplifying embodiment, the preparation measurement configuration is provided or transferred by a first message, and the evaluation measurement configuration is provided or transferred by a second message after provision or transfer of the measurement report (resulting from a preparation measurement based on the preparation measurement configuration).

Therein, the NW node decides the evaluation candidate cell set based on the at least part of the candidate cell set for which the measurement report is obtained, and the second message is configured to cause starting of performing an evaluation measurement and evaluating an execution condition at the UE. Accordingly, the UE starts performing the evaluation measurement and evaluating the execution condition upon receiving the second message.

Figure 5:
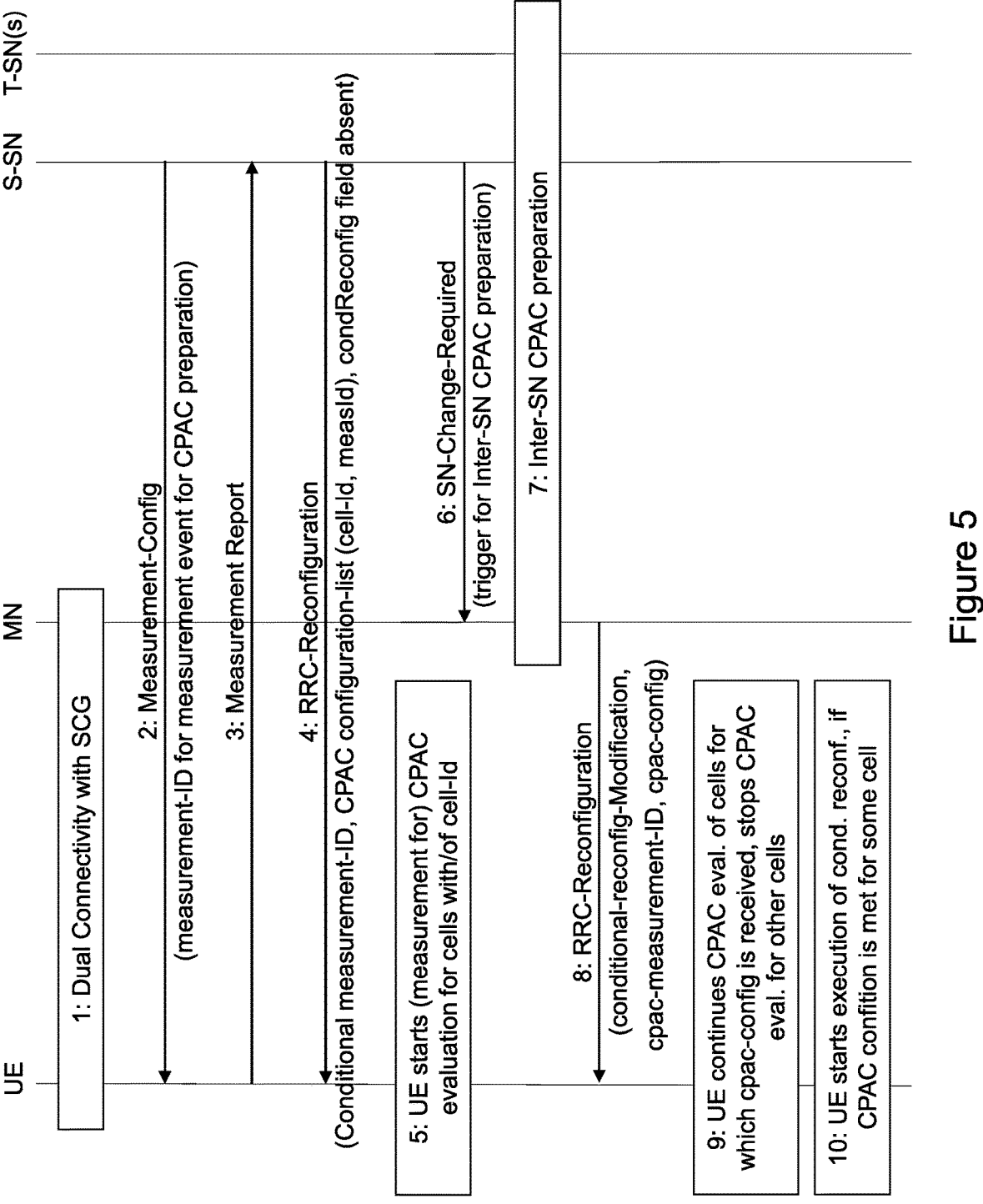
FIG. 5 shows a sequence diagram illustrating an example of a procedure of a solution for a CPAC use case according to at least one exemplifying embodiment.

FIG. 5 shows a sequence diagram illustrating an example of a procedure of this solution for a CPAC use case, i.e. SN-initiated CPAC, according to at least one exemplifying embodiment.

As part of this solution, the network (MN or S-SN) provides a measurement configuration with conditional-trigger and a conditional-reconfiguration-list which includes cell-ID information (of one or more evaluation candidate cells) but without actual CPAC (RRC) re-/configuration.

This enables early CPAC evaluation prior to actual conditional reconfiguration reception by the UE.

As shown in FIG. 5, the UE is configured with dual-connectivity (step 1), namely a master cell group (MCG) served/coordinated by the master node MN and a secondary cell group (SCG) served/coordinated by the source secondary node S-SN, while T-SN(s) denote potential/candidate target nodes for conditional reconfiguration, i.e. CPAC.

In step 2, the S-SN provides a measurement configuration to the UE, i.e. a preparation measurement configuration with an event-trigger (e.g. A3 and/or A4 events), which causes/initiates a preparation measurement of the thus indicated one or more cells of a preparation candidate cell list at the UE. As a result of the preparation measurement, the UE reports the measurement results to the S-SN (step 3). In the measurement report, which is issued with the specified event-trigger (e.g. the A3 and/or A4 events), at least part of the preparation candidate cell set is indicated or included based on the measurement results, e.g. the cells complying with the A3 and/or A4 events. Upon receiving the measurement report, the S-SN decides to initiate CPAC preparation and early CPAC evaluation.

To this end, the S-SN decides an evaluation candidate cell set based on the at least part of the preparation candidate cell set for which the measurement report is obtained. In this case, the S-SN decides the list of cells for which early CPAC evaluation is to start, based on the cells to which the S-SN initiates CPAC preparation (to perform admission control and obtain their configurations from the T-SN(s)). Thus, the thus decided evaluation candidate cells are subjected to early CPAC evaluation and CPAC preparation.

For early CPAC evaluation, the S-SN provides a RRC reconfiguration message to the UE (step 4), including an evaluation measurement configuration with a conditional-trigger, which causes/initiates evaluation measurement of the thus indicated one or more cells of the evaluation candidate cell set at the UE.

Namely, on the reception of the measurement report from the UE, the S-SN configures a measurement-ID with conditional-trigger as event type along with a conditional-reconfiguration list containing a conditional-measurement-ID and cell-ID, for each cell of the evaluation candidate cell set, but without actual CPAC (RRC) re-/configuration (as this still needs to be obtained for T-SN(S) in the CPAC configuration, which is not yet completed at that time). Stated in other words, the S-SN sends the measurement execution conditions for the cells selected based on the previously provided measurement report, wherein this message contains the execution conditions (defined in the form of measurement-IDs), but does not comprise the configurations for evaluation candidate cells, which are still to be admitted by the T-SN(s).

In step 5, the UE starts evaluation measurement and, based thereon, evaluation of the execution condition/s for the cells of the evaluation candidate cell set. That is, the UE starts the evaluation of the execution conditions while the S-SN initiates the CPAC preparation within the network (steps 6 and 7).

In step 6, which takes place upon step 3 and/or in parallel to steps 4 and/or 5, the S-SN sends a SN-Change-Required message to the MN, by which the S-SN indicates that the CPAC evaluation (for the evaluation candidate cell set) started already along with the evaluation candidate cell set (i.e. the list or set of cells subjected to CPAC preparation as well as early CPAC evaluation). That is, the S-SN issues a reconfiguration demand indication indicating that early evaluation of conditional reconfiguration is started together with the evaluation candidate cell set, wherein the reconfiguration indication is configured to cause performing preparation of conditional reconfiguration at the MN. Accordingly, the MN performs CPAC preparation with the T-SN(s), thus performing admission control and obtaining their configurations (step 7).

In step 8, the MN provides a RRC reconfiguration message, i.e. the CPAC configuration or the actual configuration for CPAC (including the previously obtained configurations of the (suited) T-SN(s)), to the UE. In this case, the CPAC configuration indicates or includes a potential target cell list. In the present example, the potential target cell list, i.e. the one or more potential target cells, is indicated or included as a modification to the entries in the conditional-reconfiguration-list included in the RRC reconfiguration message of step 4 (instead of addition).

Accordingly, when a T-SN admits the candidate cell, the MN sends the RRC Reconfiguration to the UE to provide the configuration for this target cell, respectively.

Thereupon, the UE can execute and/or control (execution of) the CPAC with respect to the potential target cell set in the RRC reconfiguration message of step 8. Namely, the UE starts CPAC execution evaluation based on the received cell-ID in the conditional-reconfiguration entries on the measurement-ID given in the CPAC configuration.

In case the CPAC evaluation/execution condition is met (for a specific cell) before or within a predefined time period before receiving a valid CPAC configuration, the UE may immediately start CPAC execution (for the specific cell) upon receiving the valid CPAC configuration (for the specific cell), i.e. the RRC reconfiguration message of step 8. Namely, when the CPAC evaluation/execution condition is met (for a specific cell), the UE may wait for a pre-/configurable time period (e.g. t milli-/seconds) for receipt of the valid CPAC configuration (for the specific cell), and performs the CPAC upon timely receipt thereof or discards/skips the CPAC otherwise (i.e. if no valid CPAC is received in time and/or the specific cell is not included in the potential target cell set). Accordingly, the UE may be supposed/configured for reception of the valid CPAC configuration with some pre-/configured timer, when the CPAC evaluation/execution condition is met before receiving the actual CPAC configuration.

In the example of FIG. 5, it is assumed that the CPAC evaluation/execution condition is not met (for any cell) before or within a predefined time period before receiving a valid CPAC configuration.

In this case, i.e. if the CPAC execution condition is not met, the UE continues the CPAC evaluation on reception of a valid CPAC configuration (for a respective cell), i.e. continues the CPAC evaluation for each cell included in the potential target cell set, but the UE stops the CPAC in the absence of a valid CPAC configuration (for a respective cell), i.e. stops the CPAC evaluation for each cell not included in the potential target cell set (step 9). That is, when a T-SN did not prepare for CPAC, its execution condition becomes invalid, and the UE thus stops evaluation thereof.

Stated in other word, the UE decodes the RRC reconfiguration message and continues the evaluation just for the cells for which the CPAC configuration is provided, while the UE may also execute or start execution of the CPAC immediately, if the execution condition for one of the cells was met not later than e.g. t milli-/seconds prior to the reception and decoding, or the UE may execute or start execution of the CPAC, if the execution condition for one of the cells is met afterwards (step 10).

Figure 6:
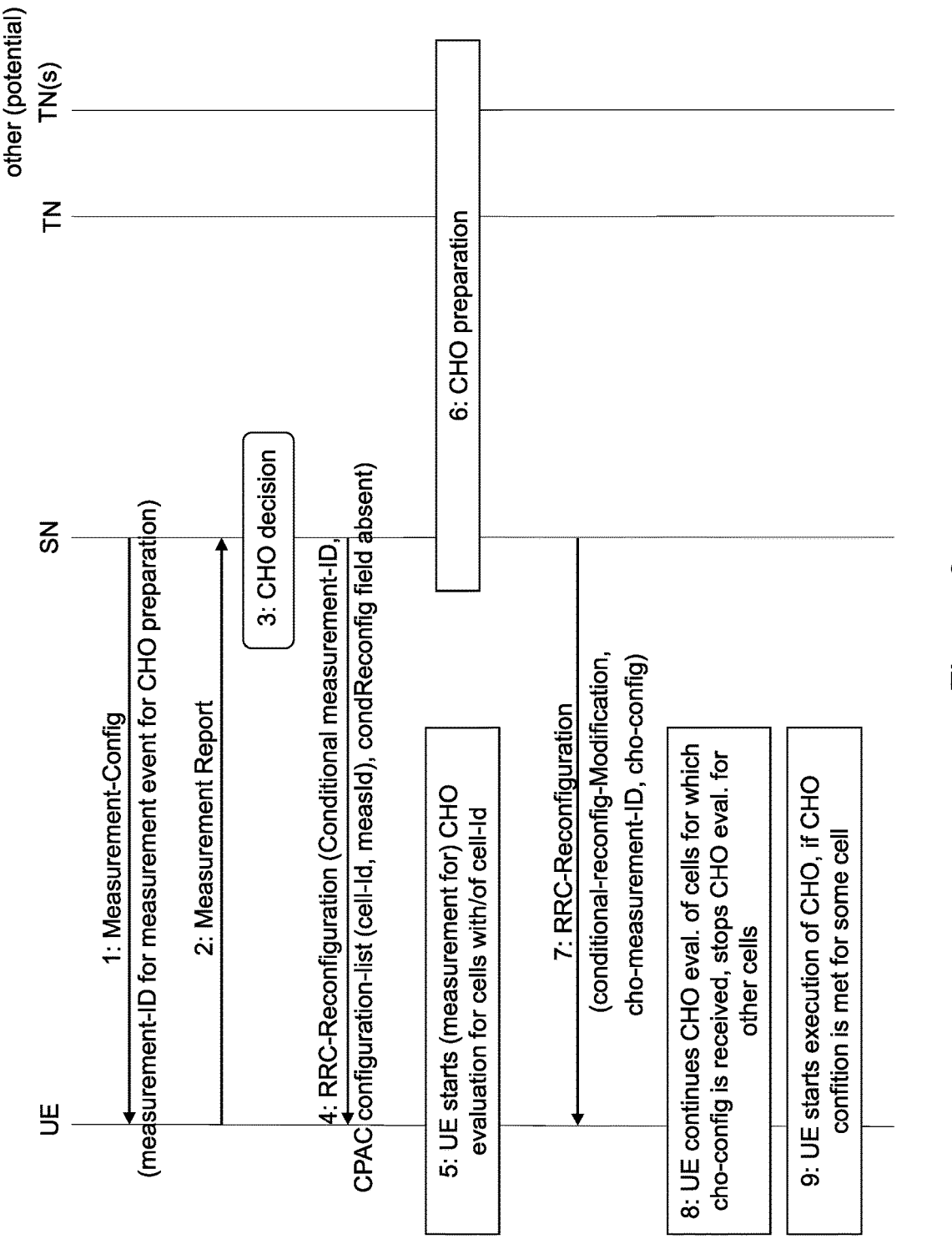
FIG. 6 shows a sequence diagram illustrating an example of a procedure of a solution for a CHO use case according to at least one exemplifying embodiment.

FIG. 6 shows a sequence diagram illustrating an example of a procedure of this solution for a CHO use case, i.e. SN-initiated CHO, according to at least one exemplifying embodiment.

Similar to FIG. 5, the network (SN) provides a measurement configuration with conditional-trigger and a conditional-reconfiguration-list which includes cell-ID information (of one or more evaluation candidate cells) but without actual CHO (RRC) re-/configuration. This enables early CHO evaluation prior to actual conditional reconfiguration reception by the UE.

The procedure for CHO, as shown in FIG. 6, is basically equivalent to the procedure for CPAC, as shown in FIG. 5. Hence, a detailed description thereof is omitted, and reference is made to the description of FIG. 5 above.

Another solution according to a second approach basically represents autonomous early evaluation of/for conditional reconfiguration based on linked measurement configurations.

In this solution according to at least one exemplifying embodiment, the preparation measurement configuration and the evaluation measurement configuration are provided or transferred by a single/same message.

Figure 7:
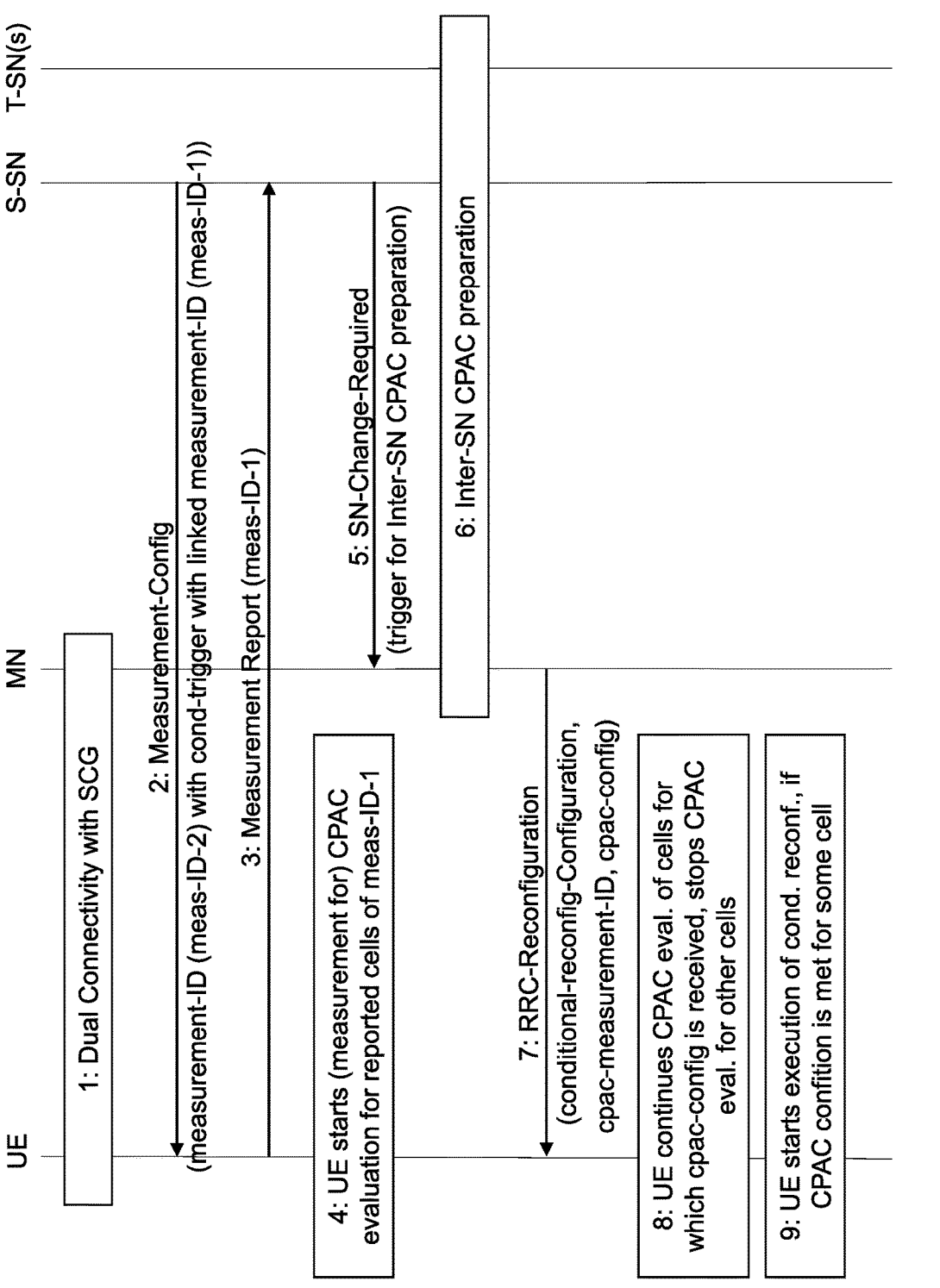
FIG. 7 shows a sequence diagram illustrating an example of a procedure of a solution for a CPAC use case according to at least one exemplifying embodiment.

Therein, the NW provides the common/combined measurement configuration, i.e. the single message, comprising a link between the preparation measurement configuration and the evaluation measurement configuration, wherein the link specifies the evaluation candidate cell set based on the at least part of the cell set for which the measurement report is obtained. Accordingly, the UE starts performing the evaluation measurement and evaluating the execution condition based on the common/combined measurement configuration or, stated in other words, in accordance with a specified event trigger (for a measurement report) or upon issuing the measurement report FIG. 7 shows a sequence diagram illustrating an example of a procedure of this solution for a CPAC use case, i.e. SN-initiated CPAC, according to at least one exemplifying embodiment.

As part of this solution, the network (SN) configures a link between a measurement-ID which is configured with an event-trigger and a measurement-ID which is configured with a conditional-trigger. The UE starts using the cells, which triggered the first measurement-ID, as cells for evaluation for the measurement-ID configured with the conditional-trigger.

Namely, the UE is preconfigured with a measurement-ID with conditional-trigger which is linked to another measurement-ID. This is the measurement-ID which, when reported, initiate the CPAC preparation at the network. On receiving the measurement-report for this measurement-ID, the SN starts the CPAC preparation. At the same time, the UE starts the evaluation for conditional-measurement-ID linked to this measurement-ID by considering the reported cells of this measurement-ID as applicable cells for evaluation.

As shown in FIG. 5, the UE is configured with dual-connectivity (step 1), namely a master cell group (MCG) served/coordinated by the master node MN and a secondary cell group (SCG) served/coordinated by the source secondary node S-SN, while T-SN(s) denote potential/candidate target nodes for conditional reconfiguration, i.e. CPAC.

In step 2, the SN provides a measurement configuration to the UE, i.e. a combined/common measurement configuration. More specifically, the SN configures two measurement-IDs, i.e. a preparation measurement configuration and an evaluation measurement configuration, with A3 and/or A4 events. One measurement-ID is configured with an event-trigger (measurement-ID-1) and another measurement-ID is configured with a conditional-trigger (measurement-ID-2). The SN also configures a sell list parameter such as cell-list-for-early-CPAC-evaluation in the measurement-ID configured with the conditional-trigger. This parameter includes a pointer to measurement-IDs whose reported cells become the cell-list for this measurement. In this case, measurement-ID-2 includes measurement-ID-1 in the cell-list-for-early-CPAC-evaluation.

Accordingly, among the preparation candidate cell set, i.e. the cells subjected to preparation measurement, those one or more cells, for which a measurement report is triggered (based on the specified A3 and/or A4 events), become cells of the evaluation candidate cell set, i.e. the cells subjected to evaluation measurement.

As a result of the thus configured preparation measurement, the UE reports the measurement results to the SN (step 3). In the measurement report, which is issued with the specified event-trigger (e.g. the A3 and/or A4 events), at least part of the preparation candidate cell set is indicated or included based on the measurement results of/for measurement-ID-1, e.g. the cells complying with the A3 and/or A4 events.

With the specified event trigger or upon issuing the measurement report, i.e. when the measurement event is triggered, the UE starts evaluation measurement and, based thereon, evaluation of the execution condition/s for the cells of the evaluation candidate cell set. That is, the UE starts evaluation for measurement-ID-2 with the reported cells of measurement-ID-1 as applicable cells for CPAC evaluation. Accordingly, the UE starts the evaluation of the execution conditions while the SN initiates the CPAC preparation within the network (steps 5 and 6).

In the procedure of FIG. 7, the remaining steps are similar to those of FIG. 5. Specifically, steps 5 to 9 of FIG. 7 are basically equivalent to steps 6 to 10 of FIG. 5. Hence, a detailed description thereof is omitted, and reference is made to the description of FIG. 5 above.

However, in contrast to the example of FIG. 5, in step 7, the MN provides a RRC reconfiguration message, i.e. the CPAC configuration or the actual configuration for CPAC, to the UE, wherein the potential target cell list, i.e. the one or more potential target cells, is indicated or included as a configuration, i.e. an addition (but not as a modification, as no conditional-reconfiguration-list had been provided to the UE beforehand).

Namely, the UE waits for reception of the CPAC configuration for execution of the CPAC, and the UE stops the evaluation for cells for which the CPAC configuration is not received, as detailed for FIG. 5.

Figure 8:
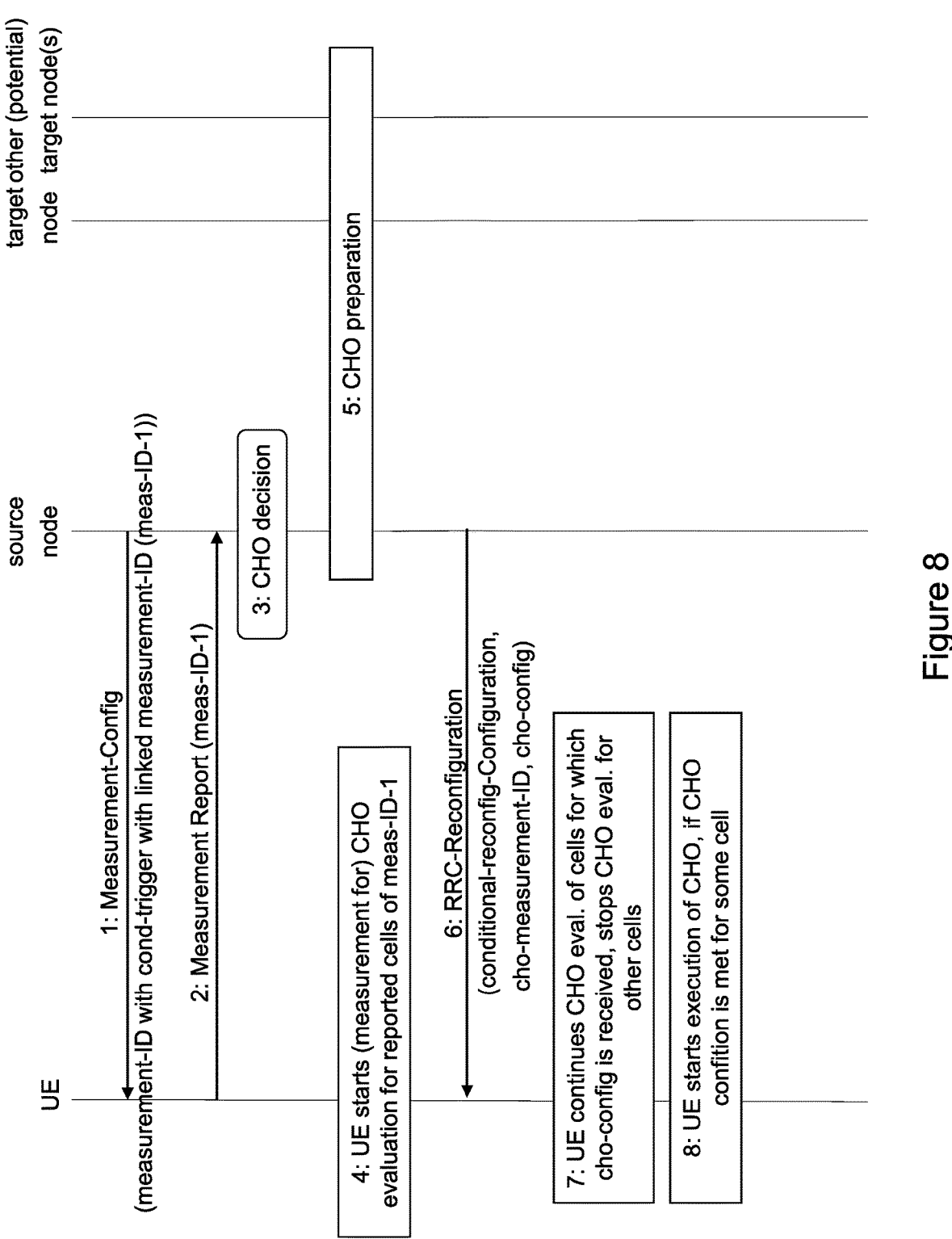
FIG. 8 shows a sequence diagram illustrating an example of a procedure of a solution for a CHO use case according to at least one exemplifying embodiment.

FIG. 8 shows a sequence diagram illustrating an example of a procedure of this solution for a CHO use case, i.e. SN-initiated CHO, according to at least one exemplifying embodiment.

Similar to FIG. 7, the network (SN) configures a link between a measurement-ID which is configured with an event-trigger and a measurement-ID which is configured with a conditional-trigger. The UE starts using the cells, which triggered the first measurement-ID, as cells for evaluation for the measurement-ID configured with the conditional-trigger.

Namely, the UE is preconfigured with a measurement-ID with conditional-trigger which is linked to another measurement-ID. This is the measurement-ID which, when reported, initiate the CHO preparation at the network. On receiving the measurement-report for this measurement-ID, the SN starts the CHO preparation. At the same time, the UE starts the evaluation for conditional-measurement-ID linked to this measurement-ID by considering the reported cells of this measurement-ID as applicable cells for evaluation.

The procedure for CHO, as shown in FIG. 8, is basically equivalent to the procedure for CPAC, as shown in FIG. 7. Hence, a detailed description thereof is omitted, and reference is made to the description of FIG. 7 above.

According to various exemplifying embodiments, various modifications and/or extensions are applicable, as appropriate.

As one example, the above techniques can be modified and/or extended to avoid a delay in or advance the execution of conditional reconfiguration, e.g. CPC, CPAC, CHO, or the like. While this is generally applicable, it may be particularly practicable for the above-described solution according to the first approach, i.e. network configuration of early evaluation of/for conditional reconfiguration.

In this regard, adopting the example of CPAC as conditional reconfiguration, the network node (i.e. the S-SN) may configure the UE with a common-configuration for CPAC. Such additional common-configuration for CPAC may be provided in addition to the cell-ID information, i.e. in addition to the evaluation candidate cell set, in a RRC reconfiguration message (see e.g. step 4 of FIG. 5 or 6).

In a MR-DC scenario, the MN may provide this common-configuration related to a random access procedure (i.e. RACH access) for potential target cells, e.g. a selected target cell, to the S-SN at the time of a SN addition procedure. The SN may include this information when it configures the UE to start the CPAC evaluation prior to the preparation and/or the actual CPAC configuration to enable early execution also for selected target cell until reception of the actual CPAC configuration.

The UE may start the random access procedure (i.e. RACH access) to the selected target cell, if the CPAC execution condition of the selected target cell is met prior to reception of the actual CPAC configuration, i.e. the dedicated target cell configuration, via the MN. As a result of the random access procedure (i.e. RACH access), the target SN of the selected target cell may configure the UE with scheduling request resources to enable the UE to complete the Msg3 transmission when the UE receives the actual CPAC configuration, i.e. the dedicated target cell configuration, via the MN.

Upon reception of the actual CPAC configuration, i.e. the dedicated target cell configuration, for which the UE has already completed the random access procedure (i.e. RACH access) part, the UE may trigger the T-SN to send RRC-Reconfiguration-complete using the dedicated configuration.

As another example, the above techniques can be modified and/or extended to enable modification of a preceding conditional reconfiguration, e.g. CPC, CPAC, CHO, or the like. While this is generally applicable, it may be particularly practicable for the above-described solution according to the first approach, i.e. network configuration of early evaluation of/for conditional reconfiguration.

In this regard, if the network intends to modify the configuration of an already prepared conditional reconfiguration at the UE, the network node (MN or S-SN) may also inform the UE at the start of (a subsequent) preparation to avoid any early execution before (obtaining/receiving) a modification/update. Thereby, execution of conditional reconfiguration may be deferred until reception of a (modified/updated) valid/actual configuration.

To this end, the network may issue a reconfiguration inhibition instruction, which is configured to inhibit execution of a specific conditional reconfiguration based on a previously obtained actual configuration, and this reconfiguration inhibition instruction is obtained by the UE. Upon obtaining an updated actual configuration for conditional reconfiguration, the UE may then control and/or execute conditional reconfiguration based on the updated actual configuration for conditional reconfiguration.

Adopting the example of CPAC as conditional reconfiguration, the network (MN or S-SN) may instruct the UE not to execute a specific CPAC (conditional reconfiguration) if its corresponding condition is met.

If the condition is not met and the UE receives a new/updated CPAC configuration, the UE behaves as usual, and continues to evaluate the condition.

If the condition is met, there may be various options. On the one hand, the UE may re-evaluate the condition (according to the new/updated CPAC configuration). On the other hand, the UE may immediately execute the CPAC according to the new/updated CPAC configuration (if the target cell die not meet the leaving condition, i.e. when the target cell is still included in the potential target cell set of the new/updated CPAC configuration).

In this regard, the UE may be configured to wait, e.g. for pre-/configurable timer, even if it already has a valid CPAC configuration at the time of execution, but/when the network is preparing a modification/update.

The UE may be configured to wait, e.g. for a pre-/configurable timer, after obtaining the reconfiguration inhibition instruction, and may control and/or execute conditional reconfiguration based on the previously obtained actual configuration for conditional reconfiguration in a case that the updated actual configuration for conditional reconfiguration is not obtained or not obtained within the pre-/configurable timer, i.e. a predefined time period (e.g. t milli-/seconds), after obtaining the reconfiguration inhibition instruction. If the updated actual reconfiguration is not received before the timer elapses but the execution condition (of the previously obtained actual configuration) is already met during this interval, the UE will start control and/or execution of conditional reconfiguration using the previously obtained actual configuration.

Accordingly, the UE may be supposed/configured for reception of the new/updated CPAC configuration with some pre-/configured timer, when/after receiving a reconfiguration inhibition instruction.

By virtue of exemplifying embodiments of the present disclosure, as evident from the above, an early evaluation for conditional reconfiguration (in a mobile/wireless communication system) can be enabled/realized. Thereby, a delay in (execution of) conditional reconfiguration can be reduced, and/or problems in terms of degraded connection quality (e.g. increased risk of RLFs, HoFs, etc.) can be reduced.

According to various exemplifying embodiments, a new/modified UE behavior based on a corresponding new/modified configuration and/or control by the network are presented for addressing the aforementioned problems of conventional conditional reconfiguration techniques.

Specifically, conditional reconfiguration can be timely executed (and degraded connection quality can be avoided) by way of a technique of enabling an early evaluation for conditional reconfiguration, i.e. an evaluation for conditional reconfiguration prior to availability of an actual configuration for conditional reconfiguration.

The present disclosure is generally applicable to any kind of conditional reconfiguration, including at least conditional dual-connectivity primary/secondary cell change, conditional PSCell (primary cell of secondary cell group) change, conditional PSCell (primary cell of secondary cell group) addition/change, conditional handover, dual-connectivity conditional handover, or the like. Referring to the example of FIGS. 5 and 7, it is to be noted that, while a case of inter-SN CPAC/handover is exemplified, the thus illustrated procedure is equally applicable for intra-SN CPAC/handover.

The above-described functionality as well as its related operations, procedures, methods and processes may be implemented by respective functional elements, entities, modules, units, processors, or the like, as described below. These functional elements, entities, modules, units, processors, or the like, i.e. the implementation of one or more exemplifying embodiments, may be realized in a cloud environment and/or in the context of network virtualization, software-defined networking, or the like.

While in the foregoing exemplifying embodiments of the present disclosure are described mainly with reference to operations, procedures, methods and processes, corresponding exemplifying embodiments of the present disclosure also cover respective apparatuses, entities, modules, units, network nodes and/or systems, including software and/or hardware thereof.

Respective exemplifying embodiments of the present invention are described below referring to FIGS. 9 and 10, while for the sake of brevity reference is made to the detailed description of respective corresponding configurations/setups, schemes, processes, sequences, methods as well as functionalities, principles and operations according to FIGS. 1 to 8.

Figure 9:
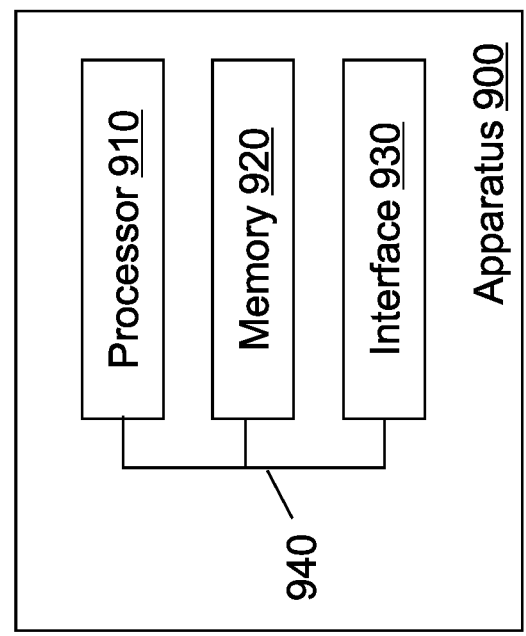
FIG. 9 shows a schematic block diagram illustrating an example of a structure of apparatuses according to at least one exemplifying embodiment.

In FIGS. 9 and 10, the blocks are basically configured to perform respective methods, procedures and/or functions as described above. The entirety of blocks are basically configured to perform the methods, procedures and/or functions as described above, respectively. With respect to FIGS. 9 and 10, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 9 and 10, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 9 shows a schematic diagram illustrating an example of a structure of apparatuses according to at least one exemplifying embodiment. Herein, an apparatus can represent a physical entity or component, i.e. a structural device implementing a specific network element, entity or function or the functionality thereof as such, or a functional or logical entity or component. For example, the thus illustrated apparatus may be realized in or by a server or the like in a cloud environment, i.e. by a cloud-based implementation.

As indicated in FIG. 9, according to at least one exemplifying embodiment, an apparatus 900 may comprise or realize at least one processor 910 and at least one memory

920 (and possibly also at least one interface 930), which may be operationally connected or coupled, for example by a bus 940 or the like, respectively.

The processor 910 and/or the interface 930 of the apparatus 900 may also include a modem or the like to facilitate communication over a (hardwire or wireless) link, respectively. The interface 930 of the apparatus 900 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 930 of the apparatus 900 is generally configured to communicate with at least one other apparatus, device, node or entity (in particular, the interface thereof).

The memory 920 of the apparatus 900 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 920 of the apparatus 900 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 900 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, should not be only considered to represent physical portions of one or more processors, but may also be considered as a logical division of the referred processing tasks performed by one or more processors.

According to at least one exemplifying embodiment, the thus illustrated apparatus 900 may represent or realize/embody a (part of a) communication node or element or entity of/in a wireless communication system. Hence, the apparatus 900 may be configured to perform a procedure and/or exhibit a functionality and/or implement a mechanism, as described (for the UE) in any one of FIGS. 1, 2 and 5 to 8.

Accordingly, the apparatus 900 may be caused or the apparatus 900 or its at least one processor 910 (possibly together with computer program code stored in its at least one memory 920), in its most basic form, is configured to obtain an evaluation measurement configuration and an evaluation candidate cell set, said evaluation measurement configuration being configured to initiate an early evaluation of conditional reconfiguration prior to availability of an actual configuration for conditional reconfiguration, perform an evaluation measurement in accordance with the evaluation measurement configuration on the evaluation candidate cell set, and evaluate an execution condition for conditional reconfiguration for the evaluation candidate cell set on the basis of a result of the evaluation measurement.

According to at least one exemplifying embodiment, the thus illustrated apparatus 900 may represent or realize/embody a (part of a) communication control node or element or entity of/in a wireless communication system. Hence, the apparatus 900 may be configured to perform a procedure and/or exhibit a functionality and/or implement a mechanism, as described (for the NW or the S-SN) in any one of FIGS. 1, 3 and 5 to 8.

Accordingly, the apparatus 900 may be caused or the apparatus 900 or its at least one processor 910 (possibly together with computer program code stored in its at least one memory 920), in its most basic form, is configured to issue an evaluation measurement configuration and an evaluation candidate cell set, said evaluation measurement configuration being configured to initiate an early evaluation of conditional reconfiguration prior to availability of an actual configuration for conditional reconfiguration, and initiate and/or performing preparation of conditional reconfiguration with respect to the evaluation candidate cell set.

According to at least one exemplifying embodiment, the thus illustrated apparatus 900 may represent or realize/embody a (part of a) communication control node or element or entity of/in a wireless communication system. Hence, the apparatus 900 may be configured to perform a procedure and/or exhibit a functionality and/or implement a mechanism, as described (for the NW or the MN or the source node) in any one of FIGS. 1, 4 and 5 to 8.

Accordingly, the apparatus 900 may be caused or the apparatus 900 or its at least one processor 910 (possibly together with computer program code stored in its at least one memory 920), in its most basic form, is configured to obtain a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, perform preparation of conditional reconfiguration with respect to the evaluation candidate cell set, and issue the actual configuration for conditional reconfiguration indicating a potential target cell set.

For further details regarding the operability/functionality of the apparatus (i.e. the processor 910 (possibly together with computer program code stored in its at least one memory 920)) according to exemplifying embodiments, reference is made to the above description in connection with any one of FIGS. 1 to 8, respectively.

As mentioned above, an apparatus according to at least one exemplifying embodiment may be structured by comprising respective units or means for performing corresponding operations, procedures and/or functions. For example, such units or means may be implemented/realized on the basis of an apparatus structure, as exemplified in FIG. 9, i.e. by one or more processors 910, one or more memories 920, one or more interfaces 930, or any combination thereof.

FIG. 10 shows a schematic diagram illustrating an example of a structure of apparatuses according to at least one exemplifying embodiment.

As shown in FIG. 10, an apparatus 1010 according to at least one exemplifying embodiment may represent or realize/embody a (part of a) communication node or element or entity of/in a wireless communication system. Hence, the apparatus 1010 may be configured to perform a procedure and/or exhibit a functionality and/or implement a mechanism, as described (for the UE) in any one of FIGS. 1, 2 and 5 to 8.

Such apparatus may comprise (at least) an obtaining unit/means/circuitry denoted by evaluation measurement configuration obtaining section 1011, which represents any implementation for (or configured to) obtaining (obtain) an evaluation measurement configuration and an evaluation candidate cell set, said evaluation measurement configuration being configured to initiate an early evaluation of conditional reconfiguration prior to availability of an actual configuration for conditional reconfiguration, a performing unit/means/circuitry denoted by evaluation measurement performing section 1012, which represents any implementation for (or configured to) performing (perform) an evaluation measurement in accordance with the evaluation measurement configuration on the evaluation candidate cell set, and an evaluating unit/means/circuitry denoted by execution condition evaluating section 1013, which represents any implementation for (or configured to) evaluating (evaluate) an execution condition for conditional reconfiguration for the evaluation candidate cell set on the basis of a result of the evaluation measurement.

Further, such apparatus may also comprise one or more sections 1014, which represent any implementation, such as a unit, a means, a circuitry or the like, for (or configured to) realize/implement any one of the additional and/or optional functionalities or operations of the communication node or element or entity, as described above, e.g. (for the UE) in any one of FIGS. 1, 2 and 5 to 8.

As shown in FIG. 10, an apparatus 1020 according to at least one exemplifying embodiment may represent or realize/embody a (part of a) communication control node or element or entity of/in a wireless communication system. Hence, the apparatus 1020 may be configured to perform a procedure and/or exhibit a functionality and/or implement a mechanism, as described (for the NW or the S-SN) in any one of FIGS. 1, 3 and 5 to 8.

Such apparatus may comprise (at least) an issuing unit/means/circuitry denoted by evaluation measurement configuration issuing section 1021, which represents any implementation for (or configured to) issuing (issue) an evaluation measurement configuration and an evaluation candidate cell set, said evaluation measurement configuration being configured to initiate an early evaluation of conditional reconfiguration prior to availability of an actual configuration for conditional reconfiguration, and initiating/performing unit/means/circuitry denoted by preparation initiating/performing section 1022, which represents any implementation for (or configured to) initiating and/or performing (initiate and/or perform) preparation of conditional reconfiguration with respect to the evaluation candidate cell set.

Further, such apparatus may also comprise one or more sections 1023, which represent any implementation, such as a unit, a means, a circuitry or the like, for (or configured to) realize/implement any one of the additional and/or optional functionalities or operations of the communication node or element or entity, as described above, e.g. (for the NW or the S-SN) in any one of FIGS. 1, 3 and 5 to 8.

As shown in FIG. 10, an apparatus 1030 according to at least one exemplifying embodiment may represent or realize/embody a (part of a) communication control node or element or entity of/in a wireless communication system. Hence, the apparatus 1030 may be configured to perform a procedure and/or exhibit a functionality and/or implement a mechanism, as described (for the NW or the MN or the source node) in any one of FIGS. 1, 4 and 5 to 8.

Such apparatus may comprise (at least) an obtaining unit/means/circuitry denoted by reconfiguration demand indication obtaining section 1031, which represents any implementation for (or configured to) obtaining (obtain) a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, a performing unit/means/circuitry denoted by preparation performing section 1032, which represents any implementation for (or configured to) performing (perform) preparation of conditional reconfiguration with respect to the evaluation candidate cell set, and an issuing unit/means/circuitry denoted by configuration issuing section 1033, which represents any implementation for (or configured to) issuing (issue) the actual configuration for conditional reconfiguration indicating a potential target cell set.

Further, such apparatus may also comprise one or more sections 1034, which represent any implementation, such as a unit, a means, a circuitry or the like, for (or configured to) realize/implement any one of the additional and/or optional functionalities or operations of the communication node or element or entity, as described above, e.g. (for the NW or the MN or the source node) in any one of FIGS. 1, 4 and 5 to 8.

For further details regarding the operability/functionality of the apparatuses (or units/means thereof) according to exemplifying embodiments, reference is made to the above description in connection with any one of FIGS. 1 to 8, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a basic system architecture of a (tele)communication network including a mobile communication system where some examples of exemplifying embodiments are applicable may include an architecture of one or more communication networks including wireless access network sub-/system(s) and possibly core network(s). Such an architecture may include one or more communication network control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of exemplifying embodiments may also be able to communicate with other networks, such as a public switched telephone network or the Internet, including the Internet-of-Things. The communication network may also be able to support the usage of cloud services for virtual network elements or functions thereof, wherein it is to be noted that the virtual network part of the (tele)communication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g. a cloud infrastructure.

Any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing an early evaluation for conditional reconfiguration (in a mobile/wireless communication system). Such measures exemplarily comprise that a communication entity obtains an evaluation measurement configuration and an evaluation candidate cell set, performs an evaluation measurement in accordance with the evaluation measurement configuration on the evaluation candidate cell set, and performs or starts evaluating an execution condition for conditional reconfiguration for the evaluation candidate cell set on the basis of a result of the evaluation measurement, in the absence of and/or prior to availability of an actual configuration for conditional reconfiguration.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
5G 5th Generation
AMF Access and Mobility Management Function
CHO Conditional Handover
CPAC Conditional PSCell Addition/Change
CPC Conditional PSCell Change
CU Central Unit
DU Distributed Unit HoF Handover Failure
LTE Long Term Evolution
MCG Master Cell Group
MN Master Node
MR-DC Multi-Radio Dual-Connectivity
NR New Radio
RACH Random Access Channel
RAT Radio Access Technology
RLF Radio Link Failure
RRC Radio Resource Control
SCG Secondary Cell Group
(S/T-)SN (Source/Target) Secondary Node
S-RLF Secondary Node Radio Link Failure
TTT Time To Trigger
UE User Equipment

The invention claimed is:

1. A method, comprising:
obtaining an evaluation measurement configuration and an evaluation candidate cell set, said evaluation measurement configuration being configured to initiate an early evaluation of conditional reconfiguration prior to availability of an actual configuration for conditional reconfiguration,
performing an evaluation measurement in accordance with the evaluation measurement configuration on the evaluation candidate cell set, and
evaluating an execution condition for conditional reconfiguration for the evaluation candidate cell set on the basis of a result of the evaluation measurement.

2. The method according to claim 1, wherein
performing the evaluation measurement and evaluating the execution condition are started at least one of in the absence of or prior to obtaining the actual configuration for conditional reconfiguration.

3. The method according to claim 1, further comprising:
obtaining a preparation measurement configuration and a preparation candidate cell set,
performing a preparation measurement in accordance with the preparation measurement configuration on the preparation candidate cell set, and
issuing a measurement report for at least part of the preparation candidate cell set in accordance with a specified event trigger on the basis of a result of the preparation measurement.

4. A method, comprising:
issuing an evaluation measurement configuration and an evaluation candidate cell set, said evaluation measurement configuration being configured to initiate an early evaluation of conditional reconfiguration prior to availability of an actual configuration for conditional reconfiguration, and
at least one of initiating or performing preparation of conditional reconfiguration with respect to the evaluation candidate cell set.

5. The method according to claim 4, wherein
the preparation of conditional reconfiguration is at least one of initiated or started to be performed upon or together with issuing the evaluation measurement configuration.

6. The method according to claim 4, further comprising:
issuing a preparation measurement configuration and a preparation candidate cell set, and
obtaining a measurement report for at least part of the preparation candidate cell set.

7. A method, comprising:
obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, performing preparation of conditional reconfiguration with respect to the evaluation candidate cell set, and issuing the actual configuration for conditional reconfiguration indicating a potential target cell set.

8. The method according to claim 7, wherein the potential target cell set is indicated as a modification of the evaluation candidate cell set.

9. The method according to claim 7, wherein the actual configuration for conditional reconfiguration is configured to cause at least one of controlling or executing conditional reconfiguration with respect to the potential target cell set at the receiving entity.

10. An apparatus, comprising:

at least one processor; and at least one memory storing instructions that, when executed with the at least one processor, cause the apparatus to perform:

obtaining an evaluation measurement configuration and an evaluation candidate cell set, said evaluation measurement configuration being configured to initiate an early evaluation of conditional reconfiguration prior to availability of an actual configuration for conditional reconfiguration, performing an evaluation measurement in accordance with the evaluation measurement configuration on the evaluation candidate cell set, and evaluating an execution condition for conditional reconfiguration for the evaluation candidate cell set on the basis of a result of the evaluation measurement.

11. The apparatus according to claim 10, wherein the instructions, when executed with the at least one processor, cause the apparatus to start to perform the evaluation measurement and evaluate the execution condition in at least one of the absence of or prior to obtaining the actual configuration for conditional reconfiguration.

12. The apparatus according to claim 10, wherein the instructions, when executed with the at least one processor cause the apparatus to perform:

obtaining a preparation measurement configuration and a preparation candidate cell set, performing a preparation measurement in accordance with the preparation measurement configuration on the preparation candidate cell set, and issuing a measurement report for at least part of the preparation candidate cell set in accordance with a specified event trigger on the basis of a result of the preparation measurement.

13. The apparatus according to claim 10, wherein the instructions, when executed with the at least one processor, cause the apparatus to perform:

obtaining the actual configuration for conditional reconfiguration indicating a potential target cell set, and at least one of controlling or executing conditional reconfiguration with respect to the potential target cell set.

14. An apparatus, comprising:

at least one processor; and at least one memory storing instructions that, when executed with the at least one processor, cause the apparatus to perform:

issuing an evaluation measurement configuration and an evaluation candidate cell set, said evaluation measurement configuration being configured to initiate an early evaluation of conditional reconfiguration prior to availability of an actual configuration for conditional reconfiguration, and at least one of initiating or performing preparation of conditional reconfiguration with respect to the evaluation candidate cell set.

15. The apparatus according to claim 14, wherein the instructions, when executed with the at least one processor, cause the apparatus to perform:

issuing a preparation measurement configuration and a preparation candidate cell set, and obtaining a measurement report for at least part of the preparation candidate cell set.

16. The apparatus according to claim 14, wherein the instructions, when executed with the at least one processor, cause the apparatus to perform:

issuing the actual configuration for conditional reconfiguration indicating a potential target cell set, wherein the actual configuration for conditional reconfiguration is configured to cause at least one of controlling or executing conditional reconfiguration with respect to the potential target cell set at the receiving entity.

17. An apparatus, comprising:

at least one processor; and at least one memory storing instructions that, when executed with the at least one processor, cause the apparatus to perform:

obtaining a reconfiguration demand indication indicating that early evaluation of conditional reconfiguration is started together with an evaluation candidate cell set for early evaluation of conditional reconfiguration, early evaluation of conditional reconfiguration referring to evaluating an execution condition for conditional reconfiguration for the evaluation candidate cell set prior to availability of an actual configuration for conditional reconfiguration, performing preparation of conditional reconfiguration with respect to the evaluation candidate cell set, and issuing the actual configuration for conditional reconfiguration indicating a potential target cell set.

18. The apparatus according to claim 17, wherein the instructions, when executed with the at least one processor, cause the apparatus to indicate the potential target cell set as a modification of the evaluation candidate cell set.

19. The apparatus according to claim 17, wherein the instructions, when executed with the at least one processor, cause the apparatus to at least one of control or execute conditional reconfiguration with respect to the potential target cell set at the receiving entity.

20. The apparatus according to claim 17, wherein the instructions, when executed with the at least one processor, cause the apparatus to at least one of:

perform admission control for the evaluation candidate cell set, or obtain configurations of the evaluation candidate cell set.

\* \* \* \* \*